B. W. TUCKER.
WINDING MACHINE.
APPLICATION FILED AUG. 4, 1909.
1,175,204.
Patented Mar. 14, 1916.
7 SHEETS—SHEET 7.
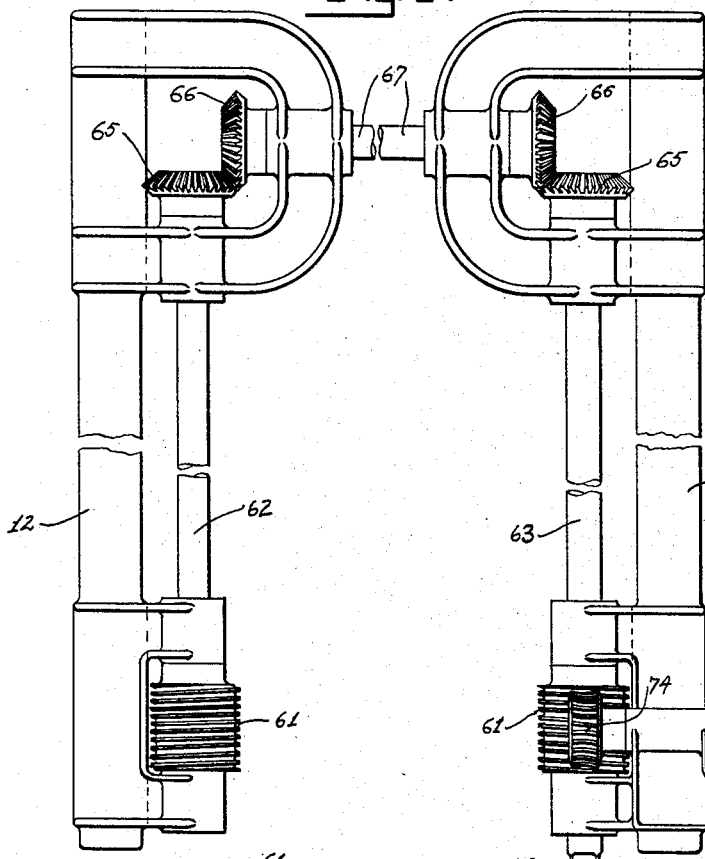
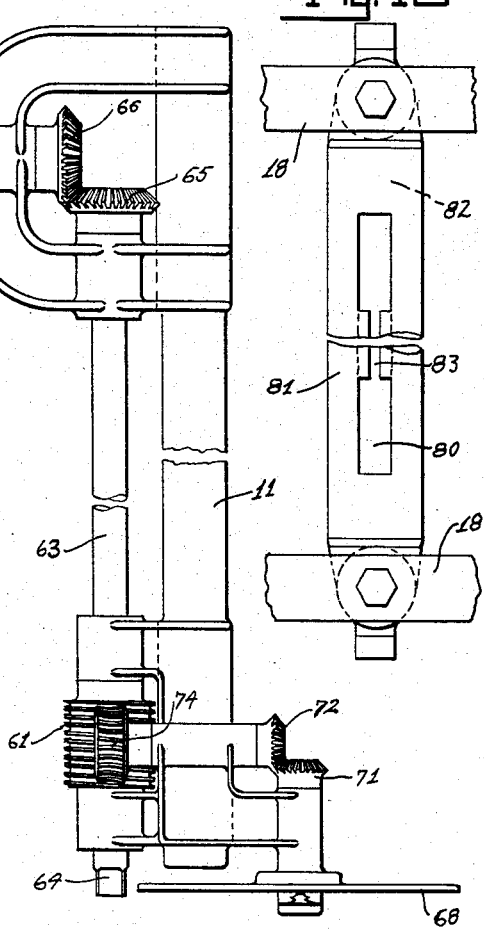
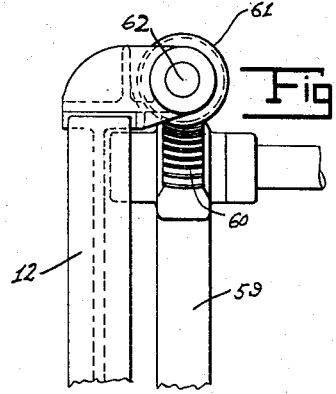
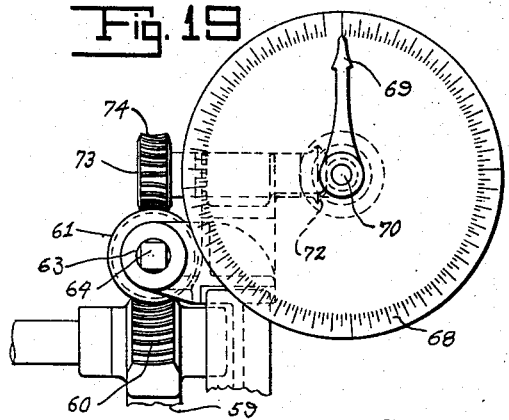

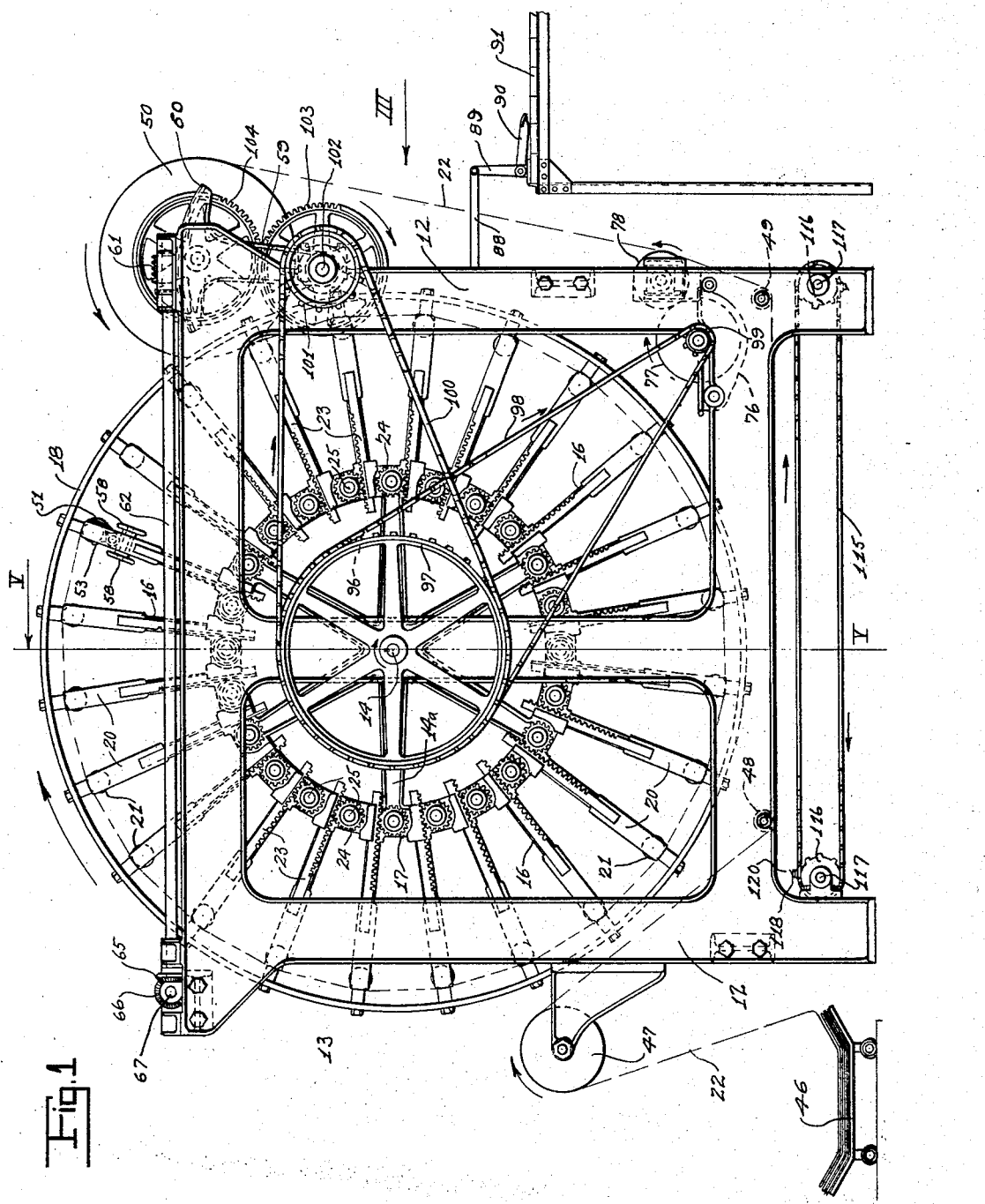

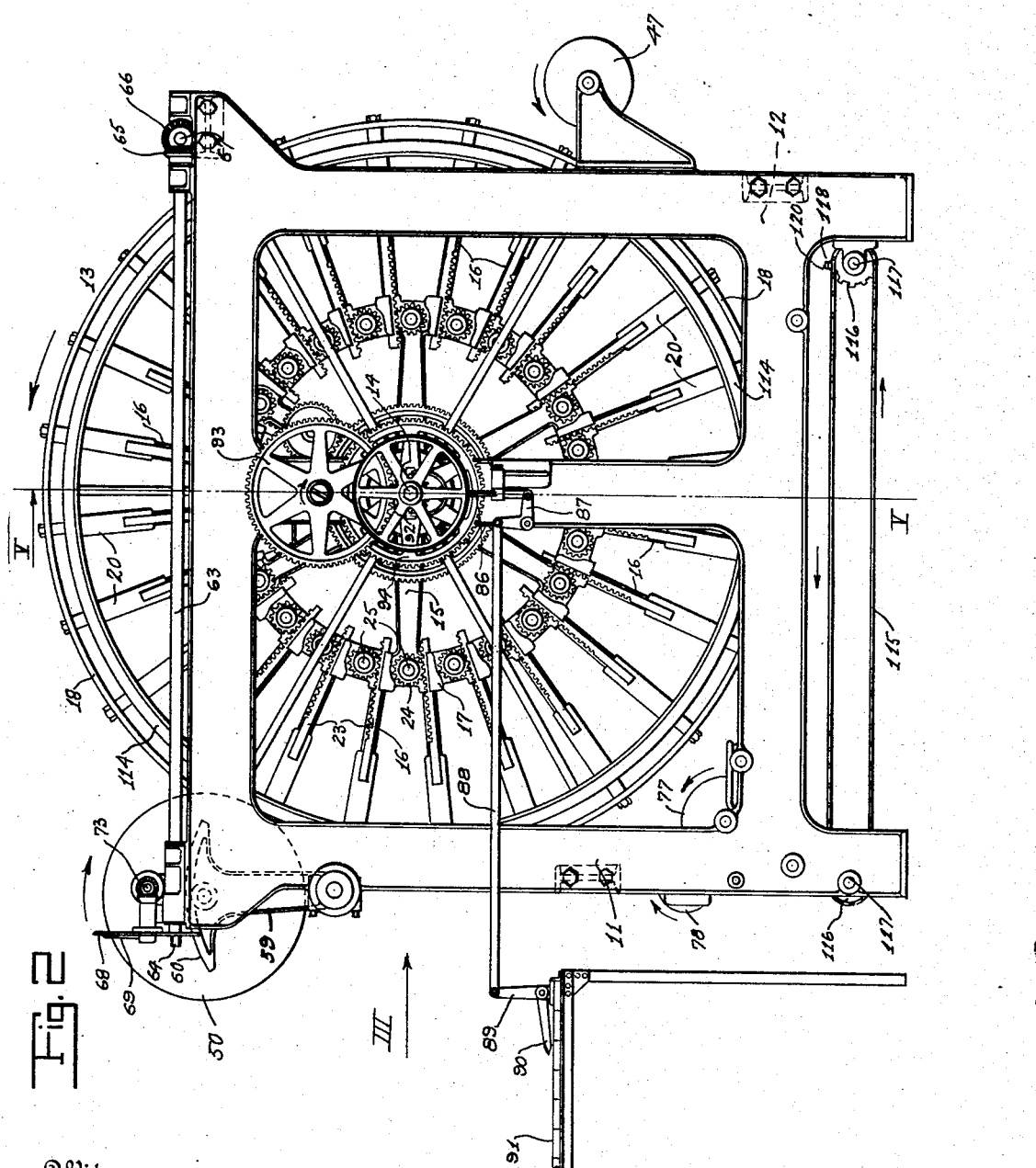

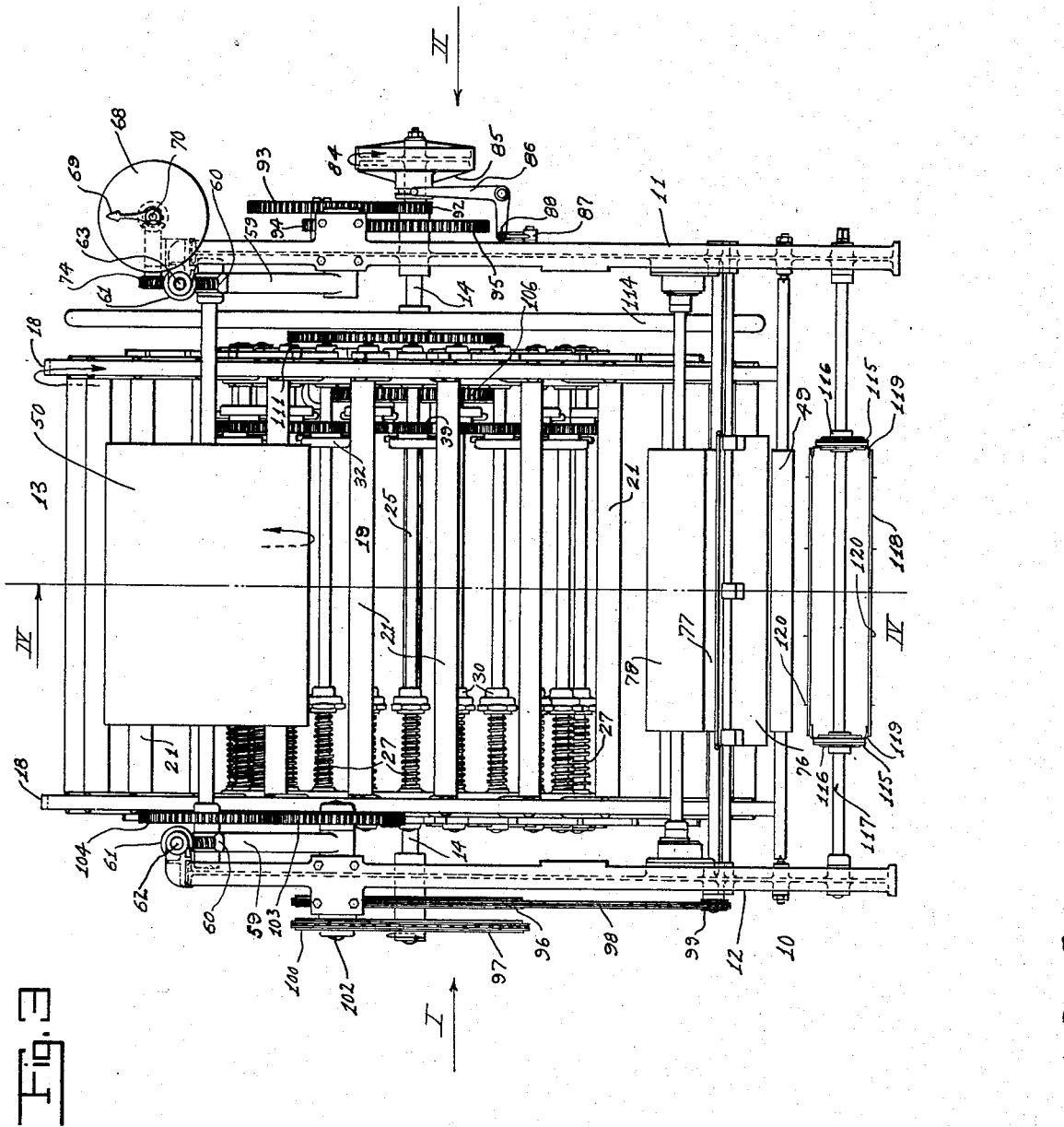

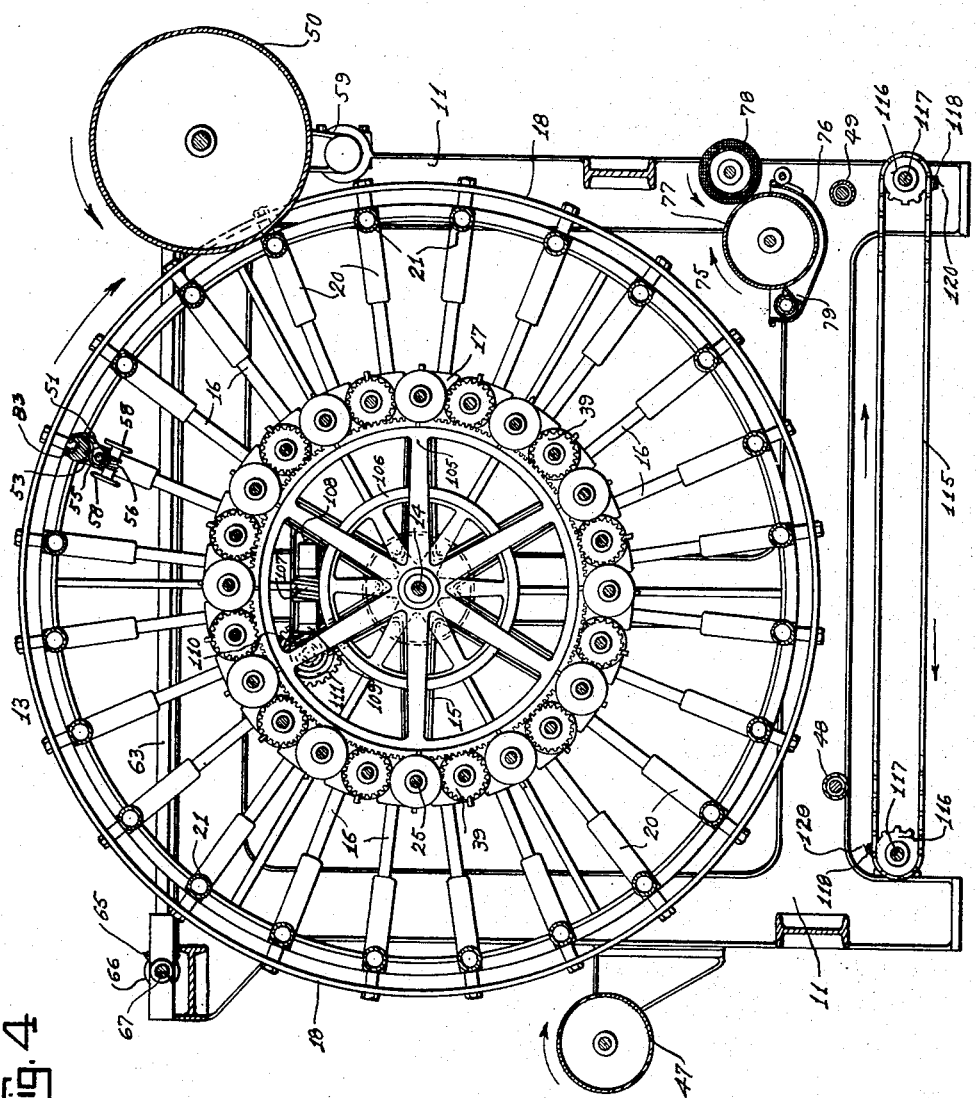

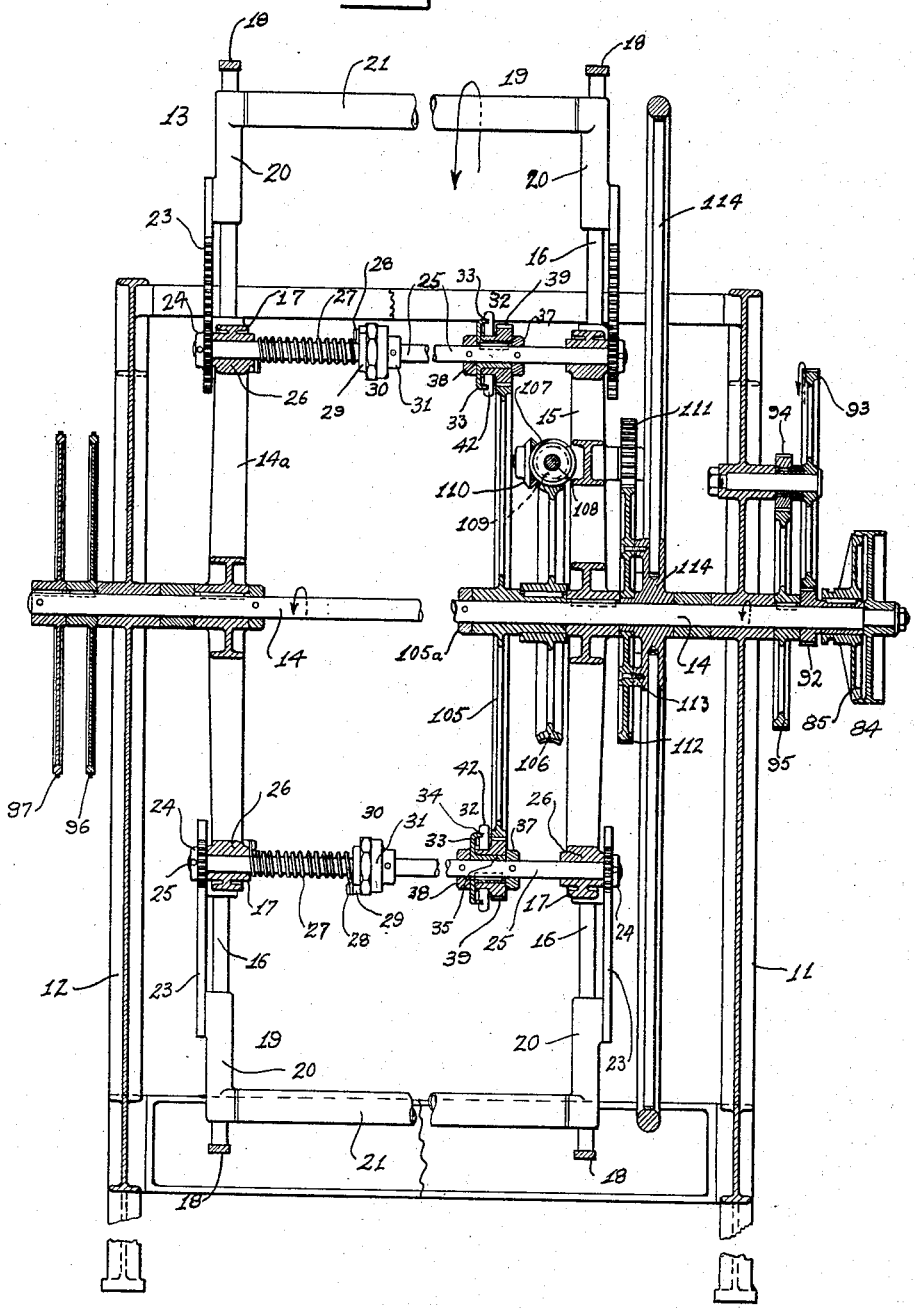

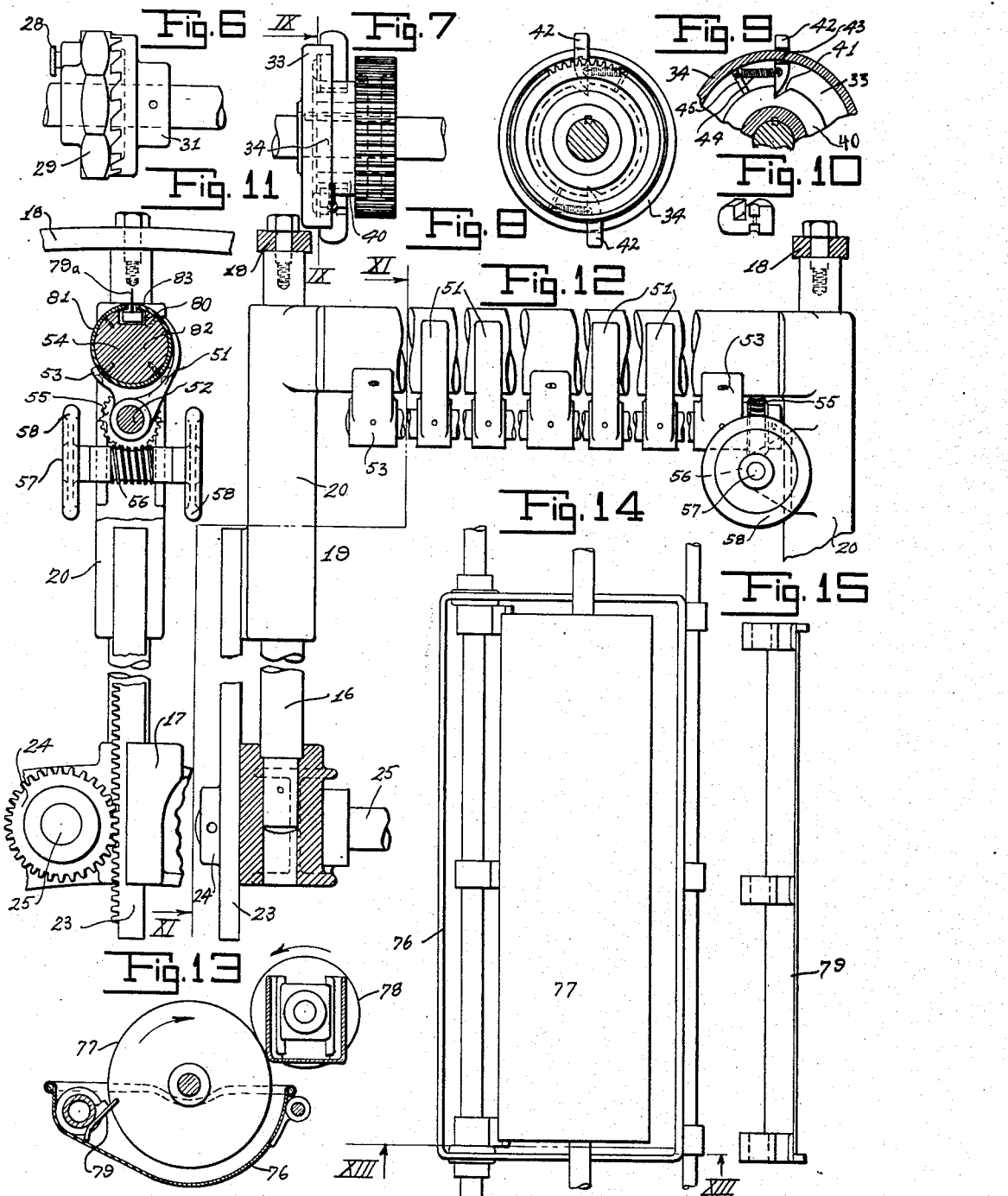

UNITED STATES PATENT OFFICE.

BENJAMIN W. TUCKER, OF SOUTH ORANGE, NEW JERSEY.

WINDING-MACHINE.

1,175,204.  Specification of Letters Patent.  Patented Mar. 14, 1916.

Application filed August 4, 1909. Serial No. 511,222.

*To all whom it may concern:*

Be it known that I, BENJAMIN W. TUCKER, a citizen of the United States, and a resident of South Orange, county of Essex, and State of New Jersey, have invented certain new and useful Improvements in Winding-Machines, of which the following is a full, clear, and exact description.

This invention relates more particularly to a cloth winding machine adapted to superpose a number of layers of cloth or fabric for the die presses employed in connection with the manufacture of collars, cuffs and similar articles.

Heretofore, so far as I am aware, it has been the practice in the manufacture of collars, etc., to arrange the fabric in a number of layers, usually forty-eight to ninety-six, and these layers are usually formed by placing the fabric on an endless apron and spreading the fabric manually back and forth along the apron or platform which is approximately twenty-five feet more or less. Such a method requires a great deal of time and the fabric is not always spread evenly or distributed properly unless considerable care is exercised, and while the laying of the cloth takes place the press can not be used so that more machinery is required on this account than would be necessary if the layers could be conveniently placed on the machine without requiring the same to be idle but for a short time.

The primary object of the invention is to overcome the objections referred to and to provide a machine in which the fabric may be quickly wound and at the same time be properly spread into layers of any desired number and each layer made to correspond in length with that of the preceding layer.

Other objects of the invention are to provide a simple, efficient and compact machine having a rotary drum or element on which the fabric may be wound; and to provide simple means whereby the fabric may be readily passed about the rotary element and held during the winding thereof.

Another object of the invention is to provide simple and efficient means whereby the length of the starting layers of fabric may be varied and the others made to correspond in length thereto, according to the nature of the blanks to be cut from the superposed layers, so that substantially the entire length of material may be utilized without waste.

A further object of the invention is to provide simple means whereby the length of the layers may be readily ascertained.

A still further object of the invention is to provide simple and efficient means for dampening the fabric and for properly spreading the same while being wound and formed into layers.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is a side elevation looking at the side opposite to that of Fig. 1. Fig. 3 is a front elevation of the machine. Fig. 4 is a vertical longitudinal section taken on the line IV—IV of Fig. 3. Fig. 5 is a vertical transverse section taken on the line V—V of Fig. 2. Fig. 6 is an enlarged detail elevation showing the means for varying the tension of the springs forming a part of the winding mechanism. Fig. 7 is a side elevation of one of the clutches of the winding mechanism. Fig. 8 is a vertical section, showing in elevation the clutch and part of the operating mechanism of the same. Fig. 9 is a fragmentary section taken on the line IX—IX of Fig. 7. Fig. 10 is a detail perspective view of one of the dogs or detents. Fig. 11 is a vertical section, partly in elevation, taken on the line XI—XI of Fig. 12, showing means for initially gripping the fabric and also a part of the means for winding the fabric. Fig. 12 is a fragmentary elevation, partly broken away, of the gripping means shown in Fig. 11. Fig. 13 is a vertical section of the means for dampening the fabric. Fig. 14 is a plan view of the device for dampening the cloth or fabric. Fig. 15 is a detail plan of the scraping bar or device for the dampening feed roll. Fig. 16 is a detail view of the initial cloth holding or gripping device, showing how the same may be adapted to permit the cloth to be cut transversely thereof. Fig. 17 is a top plan view, partly broken away, of the means for indicating the length of the layers. Fig. 18 is a fragmentary end elevation of a part of the adjusting mechanism for determining the length of the layers; and Fig. 19 is a fragmentary view of the upper part of the machine of one end showing the indicating means whereby the length of the layers may be readily ascertained.

While I shall show and describe the machine as applied to winding fabric for a particular purpose and the machine constructed in a particular way, it will be understood that the machine may be used for various purposes and various changes may be made in the construction and operation of the machine and still be within the scope of the invention.

The frame 10 may be of any desired construction and may comprise two side pieces or frame members 11 and 12, and mounted upon the frame members so as to rotate thereon is a drum or rotary element 13. This element or reel 13 is held to rotate with a shaft 14 and fixed to said shaft are the wheel members 14ª and 15 which form a part of the drum or rotary element and said wheel members have rods 16 projecting outward from the periphery of the rim portion 17, and held to the outer ends of the rods 16 are rings or annular members 18. The rods 16 are arranged in pairs, that is the rods projecting from the member 15 are opposed to the rods projecting from the member 14 of the drum, and slidingly held on each pair of rods is a device 19. These devices each have a sleeve portion 20 on each side thereof which are adapted to move radially along the rods 16 over which they fit, and connecting the sleeve portions of each device together is a bar, rod or roll 21 which extends transversely of the drum, and these devices form substantially a sectional drum about which the fabric 22 in the form of a web is adapted to be wound, as will be presently described. Each sleeve 20 is provided with a rack-bar 23 extending radially and inwardly therefrom, and the teeth of said rack-bars are adapted to engage pinions 24 held to a transversely-extending shaft 25, which latter is held to rotate in the rim portion 26 of the wheel members 14ª and 15 of the drum. Each shaft 25 is normally forced in one direction by a spring 27, one end of which is fastened to a part of the rim 26 of the drum member 14ª, and the other end to a pin or projection 28 of a member forming a part of a tension device 30. This tension device, Figs. 5 and 6, has a normally fixed member 31 which is held to the shaft 25, and each of the members 29 and 31 are provided with engaging teeth so formed that the member 28 may be moved in one direction in order that the tension of the spring 27 may be varied.

A clutch 32, Figs. 5, 7 to 10, is arranged on each shaft 25, and this clutch is adapted to permit the devices 19 to be successively moved inward and to be held in this position as the fabric or material is wound thereon, and said clutch is also constructed to permit all of the devices 21 to be forced outwardly as will be hereinafter described. The clutch may be of the usual or of any preferred construction. As shown, a wheel or disk member, as 33, having an outwardly-projecting clutch rim 34 and a hub portion 35 is secured to each shaft 25, and is arranged between the collars 37 and 38 located on opposite sides thereof. A gear 39 is held to rotate on the sleeve or hub portion 35 of the member 33, and the hub portion 40 of said gear is provided with notches or grooves 41, which are normally engaged by the ends of dogs 42, and said notches serve as an actuating point for said dogs. Each dog has a slot or groove 43 which is adapted to fit about the rim 34, and in a certain position permits the rim to move independently thereof, but in another position serves to positively grip and hold the same, and each of said dogs is normally forced in one direction by a spring 44 secured at one end thereto, and its other end held to a post or pin 45 projecting from the hub portion 40. As will be seen when any one of the devices 19 is moved inwardly, it will rotate the gears or pinions 24 by means of the rack bars 23, and this will rotate the shaft 25 operated thereby which imparts a rotary movement to the clutch member 33 and against the action of the spring 27, and as soon as the devices 19 stop their inward movement, the clutch will effectively grip and hold the member 33 and thereby prevent an outward movement of the devices 19 through the spring 27, though said springs may be used principally to counterbalance the devices 19 to which they are operatively connected. By this means an effective and sensitive grip is provided to hold the shafts 25 against rotation in one direction, but will permit the same to be positively moved in the opposite direction when the gears 39 are rotated.

The web or fabric 22 may be primarily supported in any desired way on a truck 46, and is adapted to pass over an idler roll 47 under the transversely-extending rolls 48 and 49 and around the periphery of a small drum 50, and from the drum 50 it passes around the lower part of the large winding drum or element 13 so as to be supported on the outer surface of the transversely-extending bar or parts 21 of the devices 19, as shown best in Fig. 1. The end of the web of cloth or fabric is fastened to one of the devices 19, and this gripping device, Figs. 11 and 12, may have a plurality of gripping fingers 51 which are held to a transversely-extending shaft 52 the ends of which are supported in brackets 53, secured to the transversely-extending bar 54 of one of the devices 19, this particular bar being numbered differently as it is somewhat differently constructed from the bars 21 of the other device 19 though performing a function similar to said transverse bars so far as supporting the fabric. The shaft 52 is provided at one end with a worm gear 55, and this worm gear is operated by a worm 56 which is held to rotate with the shaft 57 journaled in brackets projecting from one of the sleeves 20, and on the said shafts are hand wheels 58 whereby the fingers or gripping elements 51 may be moved to engage the fabric or object or be released therefrom.

The fabric after it is gripped by the gripping elements 51 and the drum rotated, as well as the smaller drum 50, and said drum 50 adjusted inward in the path of movement of the transverse rods 21 and rod 54 of the devices 19, the said devices 19 will be successively engaged by the drum 50 to move the same inward. As the drum 13 continues to rotate to wind the successive layers of fabric thereon, the said devices 19 will be successively forced inward according to the thickness of the fabric at each rotation of the drum 13, by the fabric over the transverse bars 21 engaging the periphery of the smaller drum 50 or any other device, and as each device 19 is moved inward radially, its clutch 32 will positively hold it in its new position. The purpose of the drum 50 and the inward movement of the devices 19 is to make each layer of the fabric correspond in length to the one preceding, thus varying the peripheral diameter of the drum 13 and making the outer layer correspond in length to that of the inner layer so that when the fabric is cut tranversely to remove it from the drum, all of the layers will be of exactly the same length in order that the superposed layers in a long web may be placed upon a conveyer or other means in a position to be operated on by the die press for cutting collars or other objects therefrom. The drum 13 as thus constructed is sectional and has a variable diameter according to the number of layers wound thereon, and instead of the drum 50 other means may be provided to engage successively the devices 19 to force the same inward.

As the size of the articles cut from the fabric after being wound vary, and to avoid waste, it is desirable that the length of the webs of superposed layers be also varied. This is accomplished by moving the drum 50 inward toward the devices 19 or away therefrom in starting the machine according to the length of the layers that are to be made, as each layer of a single winding will correspond with the initial or starting layer. As shown, the drum 50 is rotatably held in the arms 59 located on opposite sides of the machine, and these are pivotally held to the inner part of the frame pieces 11 and 12, and each arm at the upper surface thereof is provided with teeth forming a segmental worm gear 60. Each worm gear 60 is engaged by a worm 61, and these worms 61 are held to longitudinally-extending shafts 62 and 63, the latter of which is extended and provided with a rectangular or other part 64 whereby a wrench may be applied thereto to rotate the worms 61 by hand. The shafts 62 and 63 at their ends opposite the worms are provided with miter gears 65, and these gears are in mesh with smaller gears 66 held to the ends of a transversely-extending shaft 67 whereby the two worms 61 may operate in unison. By rotating the shaft 64 to rotate the worms 61, the arms 59 carrying the drum 50 may be moved inward or outward, so as to determine the peripheral diameter of the drum 13 and consequently the length of the outer layer, and as each layer will correspond with that of the preceding layer, the web of superposed layers may be made of any desired length to adapt various shapes and sizes of articles to be cut therefrom without unnecessary waste.

A dial 68 is held convenient to the machine, and this dial may have registering characters thereon to indicate feet and inches or otherwise, and movable around the dial is a pointer 69 which is held to a shaft 70. This shaft 70, Figs. 17 and 19, has a bevel gear 71 at one end thereof, and this gear is in mesh with a similar gear 72 on a short shaft 73, Fig. 2, and on the shaft 73 is a worm wheel 74 which is engaged by one of the worms 61, so that as the drum 50 or other engaging device is adjusted to determine the length of the layers, the adjustment may be readily ascertained through the movement of the pointer 69 which will accurately indicate the length of the layer being made.

The fabric in passing from the idler 49 to the drum 50, is suitably dampened, and the drum 50 is made to move slower than the drum 13 so as to have a spreading or ironing effect on the fabric. The dampening device 75, Figs. 4, 13 and 14, comprises a receptacle 76 in which water may be placed, and rotatably held on the receptacle 76 so that a part thereof will be immersed in the water, is a roll or drum 77 which is adapted to transfer the water to a fabric or other roll 78, a scraper or device, as 79, being provided to remove any surplus water from the peripheral surface of the roll or drum 77. The moisture from the roll 78 will be transferred to the fabric to properly dampen the same before it reaches the engaging drum 50. The fabric after it is wound on the drum 13 may be cut transversely to remove the same from the drum. Any suitable means may be provided for this purpose and may consist of a transversely-movable knife 79ª, Fig. 11, which is electrically or otherwise operated to move across the machine and thereby cut the layers of fabric. The operating means for the knife is not shown, but the roller or bar 54 against which the gripping members or devices 51 operate is specially constructed to adapt the cutting device to be operated transversely thereof. As shown the bar 54, Figs. 11 and 16, is slotted, as at 80, on the upper edge thereof, and formed as a part of the bar 54 is a tubular casing 81 fitting over and attached to the inner part 82 so as to provide a slot 83 lengthwise of the bar for the movement of the knife. When the knife is operated to cut the material, the latter may be then removed from the drum in a web formed of a series of superposed layers of fabric ready to be placed upon the conveyer of a die press or otherwise handled as desired.

Any suitable means may be employed for driving the drum and movable parts of the machine. As one means, I arrange a friction clutch 84 on the shaft 14, and have the movable member 85 thereof operated by a bell-crank lever 86. This lever 86 is connected to another bell-crank lever 87, and one arm of said latter lever is connected to a rod 88 at one end thereof, and the other end of said rod is held to an arm 89, and this arm is operated by a treadle 90 arranged convenient to or upon a platform 91, as shown in Figs. 1 and 2. The clutch member 85 operates a small pinion 92, and this pinion is in mesh with a gear 93. The gear 93 operates a pinion 94 and this pinion operates a gear 95, which is fixed to the shaft 14. The shaft 14 is provided with two sprocket wheels 96 and 97. A sprocket chain 98 passes around the sprocket wheel 96 and around a sprocket wheel 99 on the shaft of the drum or roll 77 of the dampening device, while a chain 100 passes around a sprocket wheel 101 arranged on a shaft 102. This shaft 102 passes through one of the arms 59 for adjusting the drum 50 and serves as a pivot therefor, and on the inner end of said shaft is a gear 103 which is in mesh with the gear 104 on the shaft of the drum 50, whereby the latter may be rotated as the drum element 13 is rotated.

To rotate the clutch elements 32 backward to restore the bars 21 and devices 19 to their normal position after the fabric wound thereon has been removed and new material is to be wound to form a plurality of layers, various means may be employed. As shown the pinion 39 of each clutch 32 is in mesh with a large gear 105, and this large gear is held to rotate on the shaft 14 independently thereof and between a collar 105ª and the inner faces of the wheel member 15. Secured to the hub portion of the gear 105 is a worm gear 106, and this gear is operated by a worm 107 secured to a shaft 108, Figs. 4 and 5, and this shaft is supported on brackets arranged on the wheel element 15. A bevel gear 109 is in mesh with a bevel gear 110, and on the shaft of the bevel gear 110 is a pinion or gear 111. This pinion is in mesh with a larger gear 112 which is secured by bolts 113 or otherwise to a large hand-wheel 114, so that by rotating this hand-wheel, the pinion 111 will be rotated and through the gears 110 and 109, worm 107, worm gear 106, large gear 105, and pinions 39 will rotate all of the clutches and shafts 25 in unison and thereby cause the pinions 24 on said shafts 25 to move the rack-bars 23 to force the devices 19 outward.

A chain or other feed element 115 is held to move around sprocket wheels 116 arranged on shafts 117 at the lower part of the machine, and these chains have transversely-extending bars 118 carried thereby which are secured at their ends to brackets or lugs 119, and these bars are provided with pins or hooks 120 to which the end of the fabric may be attached to carry the same along the machine toward the front thereof when placing the fabric in position to be wound.

From the foregoing it will be seen that an effective machine is provided whereby a fabric may be wound upon a movable element in such a way that each layer will correspond in length to that of the preceding or succeeding one, to adapt the web of layers to have a plurality of blanks simultaneously cut therefrom; that said apparatus provides means whereby the fabric may be wound quickly and accurately; that simple means is provided for varying the peripheral diameter of a winding drum to make each layer correspond in length to the others; that simple means is provided whereby various lengths of webs having a plurality of layers may be made to adapt the web for articles of different sizes and forms; that simple means is provided whereby the diameter of the drum may be restored to its normal position; that simple and effective means is provided for ironing and properly spreading the fabric; that said device is adapted for handling various kinds and natures of material; and that simple means is provided whereby the length of the fabric or layers may be readily ascertained.

Having thus described my invention, I claim as new and desire to secure by Letters Patent:—

1. A reel having rotatable spiders, bars extending longitudinally, means for guiding said bars on said spiders in a radial direction, resilient means tending to force said bars outwardly, members coöperating with said bars to force the same inwardly as the layers of material accumulate thereupon, and means for locking said bars against an outward movement after being displaced inwardly.

2. A reel of the class described, having spiders with substantially radially disposed guide members, longitudinal bars mounted on said guide members and adapted to slide inwardly thereupon, and means for locking said bars against return when moved inwardly.

3. A reel having a plurality of longitudinally disposed bars, a roller coöperating with said bars and affording means for guiding a web of material to wrap upon said reel, said roller affording means for displacing said bars inwardly one at a time as the layers of material accumulate thereupon, and means for locking each of said bars against a return outward movement when displaced inwardly.

4. In a winding machine, the combination of a drum element having a sectional periphery adapted to support a fabric thereon, means for moving said sections one at a time, by engagement with the fabric to make the diameter of said drum smaller, means for independently holding said sections, and means for simultaneously moving all the sections of the periphery to enlarge said drum.

5. In a winding machine, the combination of a drum element having a plurality of spaced devices forming a sectional periphery adapted to support a fabric, and means for moving said devices one at a time inwardly to vary the diameter of said drum by the thickness of the fabric, means for independently holding said devices, and means for simultaneously moving said sections outwardly.

6. In a winding machine, a drum having a plurality of radially movable devices forming supporting means for the fabric, means for moving said devices inwardly and radially one at a time to vary the diameter of the drum as the layers are wound thereon and by engagement with the fabric to cause each layer to be of the same length, and clutches for holding independently said movable devices against outward movement.

7. In a winding machine, a drum having independent and radially movable devices forming supporting means for the material to be wound, means for moving said devices inwardly in succession by engagement with the fabric to cause each layer to be of the same length, and clutch mechanism for holding said devices independently against outward movement.

8. In a winding machine, an element having a plurality of movable devices forming supporting means for the material, means for moving said devices inwardly by engagement with and according to the thickness of the material to cause each layer to be of the same length, means for holding said devices independently against outward movement, and means whereby said devices may be simultaneously moved outwardly.

9. The combination of a rotary element having movable devices adapted to support a fabric, a device located in the path of movement of said element and by engagement with the fabric to force said devices inward as the element rotates, and clutch mechanism for holding said devices independently against outward movement.

10. The combination of a movable element having movable devices mounted thereon adapted to support a number of layers of material, and a rotary device located in the path of movement of said element and engaging the outer layer of material to move said first-mentioned devices and cause the successive layers to be of the same length, clutch mechanism for holding said devices independently against outward movement, and means for simultaneously moving said devices outwardly.

11. The combination of a drum having radially movable devices adapted to support a fabric, a smaller drum located in the path of movement of the larger drum to force said devices inward as the drum rotates, clutches for holding the devices against outward movement, and means for rotating the clutches and thereby moving said devices outward.

12. In a winding machine, the combination with a rotary element having movable devices adapted to support a fabric, of means for rotating the element, a smaller drum arranged in the path of movement of the larger drum and adapted to successively move the devices to vary the diameter of said element as the fabric is wound thereon, means for independently holding the devices as they are forced inward, and means whereby said devices may be simultaneously forced outwardly.

13. In a winding machine, the combination of a drum having movable devices adapted to support a fabric, means for rotating the drum, means arranged in the path of movement of the drum and adapted to successively move the devices one at a time without releasing others and by engagement with the fabric to vary the diameter of said drum as the fabric is wound thereon, and means for holding the devices independently as they are forced inward.

14. In a winding machine, the combination of a drum having movable devices adapted to support a fabric, means for rotating the drum, a smaller drum arranged in the path of movement of the larger drum and adapted to successively move the devices to vary the diameter of said drum as the fabric is wound thereon, means for holding the devices independently as they are forced inwardly, and means whereby said devices may be forced outwardly.

15. In a winding machine, the combination of a drum having radially movable devices adapted to support a fabric, means for rotating the drum, a device arranged in the path of movement of the drum and adapted to successively move the devices to vary the diameter of said drum as the fabric is wound thereon, and means for holding the devices independently as they are forced inwardly.

16. In a winding machine, the combination with a drum having radially movable devices adapted to support a fabric, of means for rotating the drum, a smaller drum arranged in the path of movement of the larger drum and adapted to successively move the devices to vary the diameter of said drum as the fabric is wound thereon, and means for positively and independently holding the devices as they are forced inwardly.

17. In a winding machine, the combination of a movable element having radially and independently movable devices for supporting the material, a rotatable drum for moving said devices one at a time whereby a succession of layers may be provided each of the same length, means for holding the devices independently against outward movement, and means for rotating said holding means to force said devices outwardly.

18. The combination with a drum having a plurality of devices each having a transverse bar adapted to support a fabric, of means for rotating said drum and devices, means for moving said devices one at a time, means whereby the length of the first layer may be varied through the adjustment of the means for moving said devices and each succeeding layer made to correspond in length thereto, and clutch mechanism for holding the devices independently against outward movement.

19. The combination with a drum having a plurality of devices adapted to support a web of material, of means for rotating said drum and devices, means arranged in the path thereof and adapted to successively move the devices by engaging the fabric wound thereon, means for independently holding the devices as they are forced inward, and means for simultaneously operating said devices to initially fix the diameter of the drum and thereby determine the length of the first layer.

20. The combination of a drum having a sectional periphery adapted to support fabric thereon, means whereby the diameter may be varied by the thickness of the fabric as the fabric is wound thereon, and means for each section independent of the fabric for holding the sections of the periphery against movement.

21. The combination of an element having a sectional periphery adapted to support fabric thereon, means whereby the diameter of said element may be varied by the thickness of the fabric as the fabric is wound, and rotary clutches adapted to hold the sections against outward movement and to force said sections outward when the clutches are rotated.

22. The combination with a plurality of rotatable devices adapted to support material thereon, of a drum arranged in the path of movement of said devices adapted to successively engage the same and move said devices inwardly, means for rotating the drum, means for moving the drum toward or from the devices to determine the length of the material wound thereon, and clutches for holding the devices against outward movement.

23. The combination with a plurality of rotatable devices adapted to support material thereon, of a device arranged in the path of movement of said first-mentioned devices and adapted to successively engage the same and move said devices inwardly, means for moving the second device toward or from the rotatable devices to determine the length of the material wound thereon, and clutches for holding the devices against outward movement.

24. The combination of means adapted to support fabric thereon, means governed by the thickness of the fabric whereby a number of layers of fabric may be wound thereon and each layer be of substantially the same length, and means independent of the fabric for positively holding the fabric supporting means against outward movement.

25. The combination of an element having movable means adapted to support a number of layers of fabric about the same, means governed by the thickness of the fabric whereby the layers may be of substantially the same length, and clutches for holding the fabric supporting means against outward movement.

26. In a winding machine, the combination with a rotary element having movable devices adapted to support a fabric, means for rotating the element, a smaller drum arranged in the path of movement of the larger drum and adapted to successively move the devices to vary the diameter of said element as the fabric is wound thereon, means for holding the devices as they are forced inward, and means whereby said devices may be forced outwardly.

27. In a winding machine the combination with a drum having movable devices adapted to support a fabric, means for rotating the drum, means arranged in the path of movement of the drum and adapted to successively move the devices by engagement with the fabric to vary the diameter of said drum as the fabric is wound thereon, and means for holding the devices as they are forced inward.

28. In a winding machine, the combination with a drum having movable devices adapted to support a fabric, means for rotating the drum, a smaller drum arranged in the path of movement of the larger drum and adapted to successively move the devices to vary the diameter of said drum as the fabric is wound thereon, means for holding the devices as they are forced inwardly and means whereby said devices may be forced outwardly.

29. In a winding machine, the combination with a drum having radially movable devices adapted to support a fabric, means for rotating the drum, a device arranged in the path of movement of the drum and adapted to successively move the devices to vary the diameter of said drum as the fabric is wound thereon, and means for holding the devices as they are forced inwardly.

30. In a winding machine, the combination with a drum having radially movable devices adapted to support a fabric, means for rotating the drum, a smaller drum arranged in the path of movement of the larger drum and adapted to successively move the devices to vary the diameter of said drum as the fabric is wound thereon, and means for holding the devices as they are forced inwardly.

31. The combination with a drum having a plurality of devices each having a transverse bar adapted to support a fabric, of means for rotating said drum and devices, means for moving said devices, and means whereby the length of the first layer may be varied through the adjustment of the means for moving said devices and each succeeding layer made to correspond in length thereto.

32. The combination with a drum having a plurality of devices adapted to support a web of material, of means for rotating said drum and devices, means arranged in the path thereof and adapted to successively move the devices by engaging the fabric wound thereon, and means for varying the length of the first layer and each successive layer made to correspond in length thereto.

33. The combination with a drum having a plurality of devices each having a transverse bar adapted to support a fabric, of means for rotating said drum and devices, a small drum having a relatively slower movement than the devices and arranged in the path thereof and adapted to successively move the devices inward, and means for rotating the latter drum.

34. The combination with a drum having radially extending rods on opposite sides thereof, of a plurality of devices having transversely-extending bars to support the material and sleeves to which the bars are connected which are slidingly held on the rods, a plurality of rotary shafts operatively connected to said devices, and a clutch for each shaft adapted to hold the same each time the devices are moved inward.

35. The combination of a drum having a plurality of movable devices to support the material, a plurality of rotary shafts operatively connected to said devices, and a clutch for each shaft adapted to hold the same each time the devices are moved inward.

36. The combination with a drum having radially extending rods on opposite sides thereof, of a plurality of devices having transversely-extending bars to support the material and slidingly held on the rods, a plurality of rotary shafts operatively connected to said devices, and a clutch for each shaft adapted to hold the same each time the devices are moved inward.

37. The combination with a drum having a plurality of radially movable devices provided with transversely-extending bars to support the material and sleeves to which the bars are connected which are slidingly held on the rods, a plurality of rotary shafts each operatively connected to one of said devices, and a clutch for each shaft adapted to hold the same each time the devices are moved inward.

38. The combination with a winding drum having a plurality of radially movable devices adapted to support the material, of rack-bars connected to said devices, a shaft for each device, gears arranged on the shaft and in mesh with the rack-bars, a clutch held to each of said shafts so as to permit said devices to move inward, a spring normally forcing the shafts in one direction, a gear forming a part of each clutch, a larger gear engaging all of the gears of the clutches to operate the same simultaneously, means for manually operating the larger gear to force the devices outward, and means arranged in the path of rotary movement of the devices adapted to successively force the devices inward.

39. The combination with a winding drum having a plurality of movable devices adapted to support material, of rack-bars connected to said devices, a shaft for each device, gears arranged on the shaft and in mesh with the rack-bars, a clutch held to said shaft so as to permit said devices to move inward, a gear forming a part of each clutch, a larger gear engaging all of the gears of the clutches to operate the same simultaneously, means for operating the larger gear to force the devices outward, and means arranged in the path of the rotary movement of the devices adapted to successively force the devices inward.

40. The combination with a winding drum having a plurality of radially movable devices adapted to support the material, of rack-bars connected to said devices, a shaft for each device, gears arranged on the shaft and in mesh with the rack-bars, a clutch held to each shaft to hold said devices after they have moved inward, means for manually forcing the devices outward, and means arranged in the path of the rotary movement of the devices adapted to successively force the devices inward.

41. The combination with a winding drum having a plurality of movable devices adapted to support the material, of a gear operatively connected to move all of said movable devices, means for manually operating the gear for forcing the devices outward, and means arranged in the path of the rotary movement of the devices adapted to successively force the devices inward by engagement with the material.

42. The combination with a winding drum having a plurality of radially movable devices adapted to support the material, of rack-bars connected to said devices, a shaft for each device, gears arranged on the shaft and in mesh with the rack-bars, a clutch held to said shaft to hold said devices after they have moved inward, a spring normally forcing the shafts in one direction, and means arranged in the path of the rotary movement of the devices adapted to successively force the devices inward.

43. The combination with a winding drum having a plurality of movable devices adapted to support the material, of rack-bars connected to said devices, a shaft for each device, gears arranged on the shaft and in mesh with the rack bars, and means arranged in the path of the rotary movement of the devices adapted to successively force the devices inward.

44. The combination with a rotary drum having a number of radially movable devices adapted to support the material to be wound, of a plurality of shafts operatively connected to said devices, means whereby the shafts may be rotated in one direction as the devices are forced inward, a clutch secured to each shaft and comprising a disk member keyed to the shaft, a gear rotatably held and moved independently of the shaft, a plurality of dogs held to the gear and adapted to grip the disk member, a larger gear for simultaneously moving the smaller gears to rotate the clutches and shaft in unison in one direction, and means for operating said larger gear.

45. The combination with a rotary drum having a number of movable devices adapted to support the material to be wound, of a plurality of shafts operatively connected to said devices, means whereby the shafts may be rotated in one direction as the devices are forced inward, a clutch secured to each shaft and having a gear rotatably held and moved independently of the shaft and forming a part of the clutch, a larger gear for simultaneously moving the smaller gears to rotate the clutches and shafts in unison in one direction, and means for operating said larger gear.

46. The combination with a rotary drum having a number of radially movable devices adapted to support the material to be wound, of a plurality of shafts operatively connected to said devices, means whereby the shafts may be independently rotated in one direction as the devices are forced inward, a clutch secured to each shaft, and means for simultaneously rotating the clutches and shafts in unison to force the devices outwardly.

47. The combination with a rotary drum having a number of radially movable devices adapted to support the material to be wound, of a plurality of shafts operatively connected to said devices, means whereby the shafts may be rotated in one direction as the devices are forced inward, a clutch for each shaft, a gear rotatably held and moved independently of the shaft, a larger gear for simultaneously moving the smaller gears, means for rotating the larger gear, and means for operating the shafts through the smaller gears.

48. The combination with a rotary drum having radially disposed rods arranged in pairs, of a plurality of radially movable devices adapted to support the material and each comprising a transverse bar, sleeves to which the bar is connected and slidingly held on the rods, a plurality of shafts one for each device operatively connected thereto, a spring normally forcing each shaft in one direction, means for varying the tension of said spring, means for holding the shafts when moved inward, together with means located in the path of movement of said devices for successively moving said devices inward.

49. The combination with a rotary drum having radially disposed rods arranged in pairs, of a plurality of radially movable devices adapted to support the material and each comprising a transverse bar, sleeves to which the bar is connected and slidingly held on the rods, a plurality of rotary shafts one for each device operatively connected thereto, means for holding the shafts when moved inward, together with a rotary drum located in the path of movement of said devices for successively moving said devices.

50. The combination with a rotary drum having radially disposed rods arranged in pairs, of a plurality of devices adapted to support the material and each comprising a transverse bar, sleeves to which the bar is connected and slidingly held on the rods, a plurality of shafts one for each device operatively connected thereto, a spring normally forcing each shaft in one direction, a clutch for holding each shaft when moved inward, together with means located in the path of movement of said devices for successively moving said devices.

51. The combination with a rotary drum having radially disposed rods arranged in pairs, of a plurality of radially movable devices adapted to support the material and each slidingly held on the rods, a plurality of shafts one for each device operatively connected thereto, a spring normally forcing each shaft in one direction, means for varying the tension of said spring, a clutch for holding each shaft when moved inward, together with a drum located in the path of movement of said devices for successively and inwardly moving said devices.

52. The combination with a plurality of rotatable devices adapted to support material thereon, of a drum arranged in the path of movement of said devices adapted to successively engage the same, means for rotating the drum, and means for moving the drum toward or from the devices to determine the length of the material wound thereon.

53. The combination with a plurality of rotatable devices adapted to support material thereon, of a device arranged in the path of movement of said first-mentioned devices adapted to successively engage the same, and means for moving the second device toward or from the rotatable devices to determine the length of the material wound thereon.

54. The combination with a plurality of rotatable devices adapted to support material thereon, of a drum arranged in the path of movement of said devices adapted to successively engage the same, means for rotating the drum at a slower speed than the devices, and means for moving the drum toward or from the devices to vary the length of the material wound thereon.

55. The combination with a drum having a plurality of radially movable devices forming a sectional periphery therefor and adapted to support a web of material thereon, a smaller drum located in the path of movement of said devices and adapted to successively engage the same, means for rotating said drum at a slower speed than the movement of said devices, arms for supporting said second-mentioned drum, and means for adjusting said arms and drum and thereby determine the length of the web of layers.

56. The combination with a drum having a plurality of movable devices adapted to support a web of material thereon, a smaller drum located in the path of movement of said devices and adapted to successively engage the same, arms for supporting said drum, and means for adjusting said arms and drum and thereby determine the length of the web of layers.

57. The combination with a drum having a plurality of radially movable devices and adapted to support a web of material thereon, a smaller drum located in the path of movement of said devices and adapted to successively engage the same, means for rotating said drum, arms for supporting said drum, and means for adjusting said arms.

58. The combination with a rotary drum having means for varying the diameter thereof and on which the material may be wound to form a plurality of layers, of a drum adapted to vary the diameter of the larger drum, arms for supporting the smaller drum, segments forming a part of said arms, worms engaging said segments, means for rotating the worms in unison, means for rotating the smaller drum, and means for ascertaining the extent of movement of the smaller drum toward or from the larger drum.

59. The combination with a rotary drum having means for varying the diameter thereof and on which the material may be wound to form a plurality of layers, of a device adapted to vary the diameter of the drum, means for moving said device toward or from the drum, and means for ascertaining the extent of such movement of the device.

60. The combination with a rotary drum having means for varying the diameter thereof and on which the material may be wound to form a plurality of layers, of a device adapted to vary the diameter of the drum, arms for supporting the device, segments forming a part of said arms, worms engaging said segments, and means for rotating the worms in unison.

61. The combination with a rotary drum having means for varying the diameter thereof and on which the material may be wound to form a plurality of layers, of a device adapted to vary the diameter of the drum, arms for supporting said device, segments forming a part of said arms, worms engaging said segments, means for rotating the worms in unison, and means for ascertaining the extent of movement of the segments and device.

62. The combination with a drum having a plurality of radially movable devices, of means adapted to engage said devices as the drum rotates to vary the diameter thereof, a dial, a pointer movable about the dial, a worm gear for operating the pointer, and a worm for operating the worm gear and also forming a part of the means for varying the diameter of the drum.

63. The combination with a drum having a plurality of movable devices forming a support for layers of fabric, of means adapted to engage said devices as the drum rotates to vary the diameter thereof, and means for determining the length of the layers including a dial, a pointer movable about the dial, a worm gear for operating the pointer, and a worm for operating the worm gear and also forming a part of the means for varying the diameter of the drum.

64. The combination with a rotary drum having a plurality of radially movable devices adapted to support the material thereon to be wound, means for moving said devices radially, clutches operatively connected to said devices to hold said devices in their adjusted position, a gear forming a part of each clutch, a larger gear in mesh with the gears of each clutch to move the same in unison, worm mechanism for operating the larger gear, a pinion for operating the worm mechanism, a larger gear in mesh with the pinion, and a hand wheel for operating the last-mentioned gear to operate the clutches in unison to force the supporting devices outward.

65. The combination with a rotary drum having a plurality of movable devices adapted to support the material thereon to be wound, means for moving said devices radially, clutches operatively connected to said devices to hold said devices in their adjusted position, a gear forming a part of each clutch, a larger gear in mesh with the gears of each clutch to move the same in unison, and a hand wheel operatively connected to the larger gear to operate the clutches in unison to force the supporting devices outward.

66. The combination with means adapted to wind and support a plurality of layers of fabric thereon and including a plurality of transversely-extending bars, a gripping device having a plurality of fingers coöperating with one of the supporting bars, a shaft to which the fingers are secured, a worm gear secured to the shaft, a worm for operating said worm gear, and means for operating said worm.

67. The combination with a plurality of transversely-extending supporting bars for a fabric, of a gripping device having a plurality of fingers for clamping the material between said fingers and one of the bars, a shaft to which the fingers are secured, a worm gear secured to the shaft, a worm for operating said worm gear, and means for operating said worm.

This specification signed and witnessed this 3rd day of August A. D. 1909.

BENJAMIN W. TUCKER.

Witnesses:
FREDERICK B. BLACKMAN,
J. A. E. CRISWELL.

Copies of this patent may be obtained for five cents each, by addressing the "Commissioner of Patents, Washington, D. C."